Dec. 18, 1962 U. F. GIANOLA 3,069,661

MAGNETIC MEMORY DEVICES

Filed Oct. 16, 1957

INVENTOR
U.F. GIANOLA
BY
Kenneth B Hamlin
ATTORNEY

United States Patent Office 3,069,661
Patented Dec. 18, 1962

3,069,661
MAGNETIC MEMORY DEVICES

Umberto F. Gianola, Florham Park, N.J., assignor to Bell Telephone Laboratories, Incorporated, New York, N.Y., a corporation of New York Filed Oct. 16, 1957, Ser. No. 690,478
18 Claims. (Cl. 340—174)

This invention relates to magnetic memory devices and more particularly to such devices in which information is stored in the form of representative magnetic states and to methods for fabricating such devices.

Magnetic memory devices, particularly those exploiting magnetic materials, such as certain ferrites, displaying a substantially rectangular hysteresis characteristic, are well known and have advantageously found wide application wherever information in a binary form must be temporarily or permanently stored. Thus, for example, magnetic cores of a toroidal form have achieved a particular prominence in computer and data processing applications because of their ability to remain in either of two conditions of remanent magnetization to which driven by an applied magnetomotive force. Toroidal cores, and those which represent specific variations of the closed toroidal core structure, normally have inductively coupled thereto two or more windings which may be used to "set" the core to a particular magnetic condition representative of an information bit to be stored. This may be accomplished by passing a sufficient current either partially through more than one winding or the entire current can be passed through a single winding to produce the required magnetomotive force. Read-out is normally accomplished by switching the magnetic condition of the core in a similar manner and observing the signal, if any, produced on a sensing conductor also inductively coupled to the core being read.

The inductive coupling may be accomplished by actually winding a conductor about the core a number of times in the conventional manner or a conductor may merely thread the core to achieve the necessary inductive coupling. Magnetic cores of whichever form having a closed flux path are thus well known as individual memory cells and their many advantages have made possible broad advances in the information handling and switching arts. Conventional magnetic core memory circuits, such as, for example, memory matrices, before being capable of performing their information handling function, however, must be fabricated. The necessary conductors controlling and sensing the magnetic states of the cores must be operatively associated with the cores and the cores themselves must either be mounted or maintained in a manner so as to prevent interaction or interference. A number of expedients, including tedious manual methods, of winding and threading of the individual cores of a core circuit are known. All, however, have left room for improvement in the manner of meeting the core wiring problem and the fabrication of magnetic core circuits, especially in the case of large scale memories, has often heretofore accordingly proved costly and time consuming.

Where considerations of available space dictate it has also been frequently found necessary to reduce the circuit components including the magnetic memory elements to minimal dimensions. In view of the above demands of winding and threading of the toroidal cores by a number of, and frequently, by many, conductors a limiting dimension is reached below which a toroidal core is not conveniently reducible.

Further, the particular structural configuration of toroidal cores prevents their most economic production from materials exhibiting a maximum degree of temperature stabilization. As a result individual characteristics of toroidal cores change rapidly with temperature and it is generally necessary to provide some means to temperatiure stabilize magnetic core memory circuits such as those presented by the core arrays of memory matrices. This requirement of temperature stabilization too may prove undesirable in many applications of magnetic memory systems.

The foregoing considerations of magnetic cores and magnetic core memory circuits have been presented to illustrate limiting factors eventually encountered in many extensive core applications. Magnetic toroidal cores although generally representing the optimum in many binary information storage systems, thus may present limitations where the highest degree of utility and performance is required. Accordingly, it is an object of this invention to provide a new and improved magnetic storage element.

It is another object of this invention to accomplish the storage of information as represented by a particular magnetic state in a new and simpler manner, involving fewer structural elements, and affording advantages not heretofore known.

A further object of this invention is the realization of a new and improved magnetic memory matrix.

A still further object of this invention is the provision of a new and improved magnetic memory matrix capable of being fabricated in a manner involving fewer steps and none of the problems of winding and threading encountered in previous known magnetic memory matrices.

Yet another object of this invention is the reduction in the size of individual magnetic memory elements and also in the size of magnetic memory matrices comprising such elements.

It is also an object of this invention to provide a magnetic memory element of a character such as to effect a substantial reduction in the cost and the time required in the fabrication of larger memory circuits of which the memory element is part.

Still another object of this invention is to permit the manufacture of a magnetic memory element from materials exhibiting a greater degree of temperature stability.

The foregoing objects are realized in accordance with the principles of this invention by establishing a preferred or "easy" magnetic flux path in association with an electrical conductor. The electrical conductor with its associated preferred magnetic flux path then constitutes one of the elements of a new conductor-memory element or cell. An information bit may be stored in such a conductor-memory element by passing a current through a conventional electrical conductor inductively coupled to the conductor having the preferred path established therein. As a result, a magnetic flux of a particular direction is induced in the conductor-memory element with the flux assuming the "easy" or preferred path originally established.

Another magnetic memory element realizing the above objects and organized according to similar principles as that of the present invention is that described by A. H. Bobeck in the copending application filed August 1, 1957, Serial No. 675,522.

In one illustrative embodiment according to the principles of the present invention a preferred longitudinal path is established in a conductor of a magnetic material. Such a longitudinal preferred path may conveniently be established in a magnetic conductor in a number of ways. For example, a longitudinal stress may be exerted on the conductor and when this means is employed a ready comprehension of this invention may be obtained in accordance with known principles of magnetism generally. In terms of the domain explanation of ferromagnetism it is known that the direction of magnetization in each domain of a material is in one of the preferred directions established by the local magneto-crystalline and strain anisotropies. In this invention a ferromagnetic material is employed exhibiting substantially rectangular hysteresis characteristics such as, for example, the material known commercially as 68 Permalloy. In such a material these preferred directions are distributed at random within the material. When the material is magnetized the magnetizations of the domains assume the preferred direction which most nearly coincides with the magnetizing field thus giving the material its retentive property. If a perturbing orthogonal external field is now applied, the magnetization of the domains will rotate to a new equilibrium direction established by the applied field and the local anisotropy previously referred to. When this perturbing external field is removed, the magnetization of the domains may return to its original preferred direction, thus providing the basis for a non-destructive property. However, if the rotation has been sufficiently large the magnetization of some of the domains may find it more favorable to assume a preferred direction other than the original one with the result that an irreversible flux change is produced.

Such irreversible flux changes may become disadvantageous when practical applications of the foregoing principles are contemplated. In order to reduce the irreversible component of the induced magnetization of the material a strain anisotropy parallel to the longitudinal axis of the conductor is introduced with the result that two dominant preferred directions of magnetization can be realized, if the material employed has positive magnetostriction. If an unannealed Permalloy conductor, for example, is subjected to a tension the preferred direction of magnetization will be parallel to the axis of the conductor.

When an interrogating magneic field is now applied normal to the direction of stress, the magnetization of the domains although remaining constant in magnitude will be rotated out of the direction of stress. This rotation may then be observed in the form of a voltage induced in an inductively coupled winding of the conductor. In accordance with the foregoing principles it is a feature of this invention that when the interrogating magnetic field is withdrawn the original direction of magnetization of the conductor along its longitudinal axis is resumed. As a result the information represented by the particular magnetic direction is not destroyed by interrogation.

Another aspect of this invention is the fact that ferromagnetic materials such as the 68 Permalloy previously referred to may be used to substantially extend the range of temperatures within which the memory element may be operated. Such materials are characterized by higher Curie temperatures than are the ferrite materials used in conventional, known memories and accordingly result in a higher degree of temperature stability.

According to another advantage of this invention, the basic magnetic memory element itself may constitute one of the conductors through which a current is passed to set the element to a particular magnetic condition representative of a binary information value to be stored. This makes possible coincident current operation when a second current is coincidentally applied to a conventional conductor inductively coupled to the memory element.

It is another feature of this invention that a conductor-memory element in accordance with the foregoing feature has a longitudinal preferred or "easy" flux path established therein by subjecting the conductor to a tensional stress such that an induced magnetization of either direction will follow the preferred flux path established.

A further feature of this invention comprises a longitudinal preferred flux path established in a magnetic conductor by annealing the conductor in a longitudinal magnetic field.

According to another feature of this invention, a plurality of basic magnetic conductor elements, each having a preferred longitudinal flux path established therein, may be arranged in parallel and substantially at right angles to a plurality of parallel conventional conductors to form a lattice or array. The conventional conductors are inductively coupled to the magnetic conductors at their points of intersection, which points mark the information addresses on the magnetic wires, and the conventional conductors may conveniently comprise the X coordinate conductors of the array. A second plurality of conventional conductors is respectively arranged substantially parallel to the magnetic conductors and also inductively coupled to the magnetic conductors at the points of intersections marking the information addresses. The latter plurality of conventional conductors may now conveniently comprising comprise the Y coordinate conductors of the array. When the coordinate conventional conductors are associated with suitable known access circuits a concident current magnetic memory matrix is realized operating in a manner analogous to a conventional magnetic core array. Suitable coincident currents may be applied to the coordinate conductors defining the address, of the total magnitude necessary to establish a magnetization of a particular polarity in the portion of the longitudinal path of the magnetic conductor element constituting the address. Read-out in such an array may be either on a single-bit or word organized basis and is accomplished by applying a current to a desired conductor-memory element itself thereby producing a magnetic fie d orthogonal to the conductor-memory element. The induced voltages which are generated by the shift of the magnetic flux in the longitudinal paths at the information addresses on the conductor interrogated may then be observed as read-out signals on either of the sets of coordinate conventional conductors defining the information addresses and will be indicative of the information stored in those addresses.

According to still another feature of this invention a magnetic memory matrix of the character described in the foregoing but having only a single group of inductively coupled conventional conductors may be realized. In such a matrix the magnetic conductors constitute one of the two groups of coordinate conductors to which coincident currents may be applied. Read-out in such a matrix is the same as that described for the matrix referred to above.

The foregoing and other objects and features of this invention will be clearly understood from a consideration of the detailed description thereof which follows when taken in conjunction with the accompanying drawing in which.

Figures 1, 2, 3:
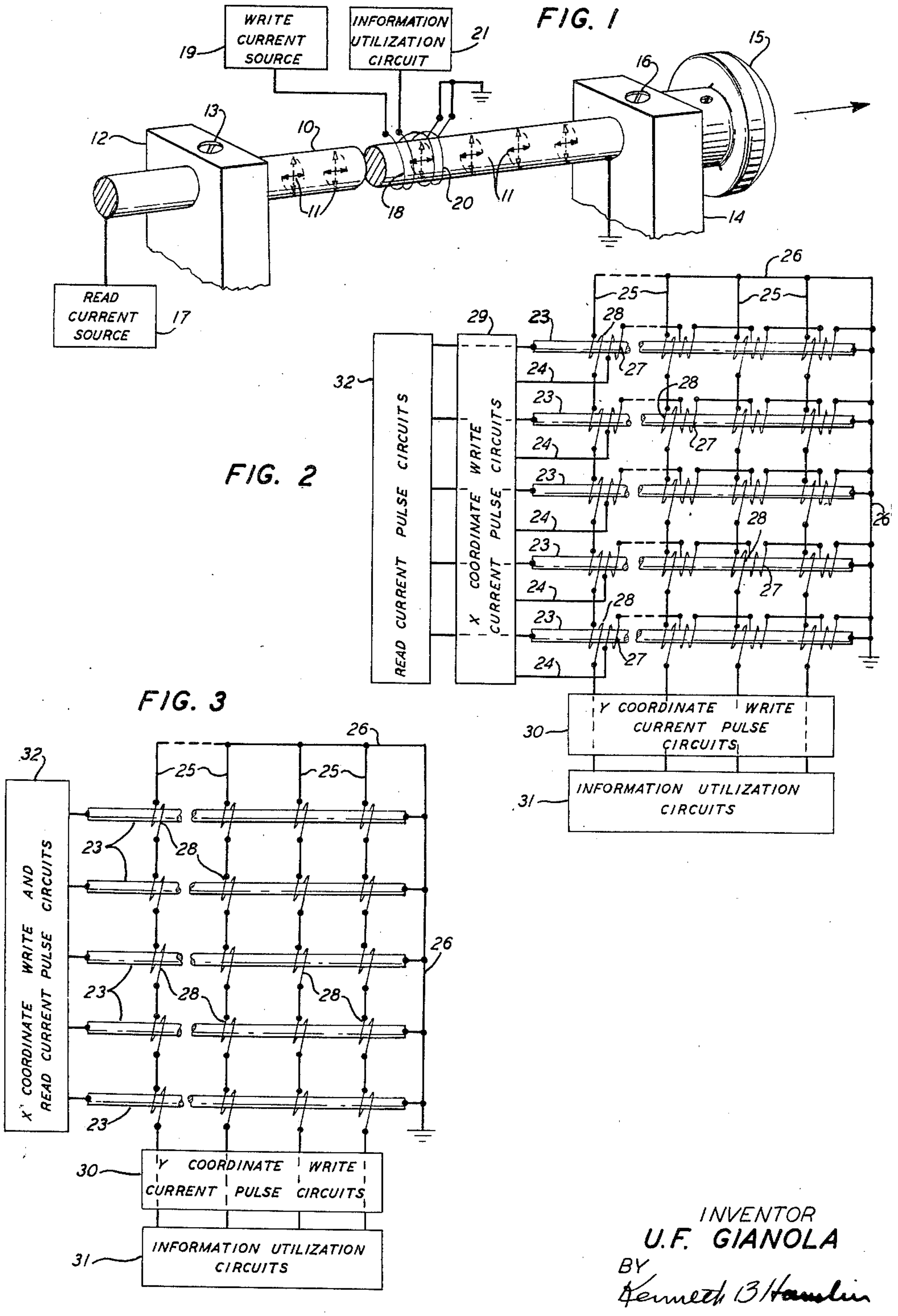
FIG. 1 depicts an illustrative magnetic memory element according to the principles of this invention together with a representative means for establishing a preferred longitudinal flux path in the memory element.
FIG. 2 depicts an illustrative memory matrix utilizing the memory elements of this invention which elements are shown slightly enlarged for purposes of contrast.
FIG. 3 depicts another illustrative memory matrix utilizing the memory elements of this invention which elements are also shown slightly enlarged for purposes of contrast.

As shown in FIG. 1 an illustrative magnetic memory element according to this invention comprises the magnetic conductor 10 in which a longitudinal flux path has been established. The longitudinal flux path is represented symbolically in FIG. 1 by the double-ended arrows 11. In one embodiment of this invention an unannealed wire having a diameter of the order of .010 inch was found satisfactory for this purpose. The hysteresis loop characteristic in the axial direction of such a wire was also found to be sufficiently rectilinear to meet magnetic remanence requirements. Assuming initially the absence of a preferred flux path in the conductor 10, a preferred longitudinal path may conveniently be established therein by applying a tensional stress thereto in the manner suggested in FIG. 1. Thus, one end of the conductor 10 may be rigidly maintained in a block 12, a portion of which is shown. The conductor 10 may be maintained in the block 12 in any convenient manner such as by the set screw means 13. The other end of the conductor 10 may be passed through another block 14, a portion of which is also shown in FIG. 1, and terminated in a gripping means such as the knob 15 affixed to the conductor 10. By means of the knob 15 a tensional stress of any desired amount may be applied to the conductor 10 after which the conductor may be maintained in tension by setting a screw means 16. A preferred direction of magnetization is thus readily established in accordance with the principles previously considered, in a substantially longitudinal direction. Although the material used in one specific embodiment of this invention, namely 68 Permalloy, responds magnetically to an applied tension in the above manner, other means of establishing a preferred longitudinal flux path may be employed. Thus, for example, by annealing a conductor of a suitable material in a longitudinal magnetic field the longitudinal, predisposed direction of magnetization may be set into the conductor.

In the memory element shown in FIG. 1, one end of the conductor 10 is connected to ground and the other end is connected to a suitable source of read current 17. An insulated solenoid 18 also connected at one end to ground and at the other end to a suitable source of write current 19 is inductively coupled to the magnetic conductor 10 by its winding. The current sources 17 and 19 may be of any type well-known in the art suitable for producing desired current pulses and are shown only in block diagram form. In practice the solenoid function may be accomplished by a single insulated copper conductor passing at an angle with the conductor 10 and inductively coupled thereto. A read-out solenoid 20 also connected at one end to ground is also inductively coupled to the conductor 10 by its winding and may conveniently be wound adjacent to the solenoid 18; the windings of the solenoids 18 and 20 may thus conveniently define an information address on the conductor 10. Connected to the other end of the solenoid 20 is an information utilization circuit 21 which may conveniently comprise any of the well-known circuits capable of utilizing signals representative of binary information values and is shown only in block diagram form.

Assuming the presence in the conductor 10 of a flux in the longitudinal path of one direction along one of the two directions indicated symbolically by the double-ended arrows 11, a current may be applied from the source 19 to the solenoid 18 of a magnitude sufficient to generate a magnetomotive force which will switch the flux in an opposite direction in the longitudinal path to represent a binary value such as, say, a "1." The magnitude of this force may be defined as $h$, and the entire current producing this force may be applied from the source 19 to the solenoid 18 to induce a magnetization representative of a particular binary value along the preferred longitudinal path. The polarity of the current pulse required from the source 19 will, of course, depend upon the sense of the winding of the solenoid 18. The induction of the flux of the desired polarity in the preferred longitudinal path as described constitutes the write phase of the memory function.

Information stored in the memory conductor 10 is read out by applying a current from the source 17 to the magnetic conductor 10 itself. A field is thereby produced everywhere orthogonal to the direction of stress and the magnetizations in the domains of the information address will be shifted at right angles to the preferred direction in accordance with the principles previously described. This shift is represented symbolically in FIG. 1 by the counterclockwise rotation of the double-ended arrows 11. The shift of the magnetizations may then be observed by the information utilization circuit 21 as an induced voltage in the solenoid 20. When the interrogating current pulse from the source 17 is removed from the conductor 10 the magnetizations of the domains will return to the preferred longitudinal path also in accordance with the principles previously described. The particular binary bit stored in the conductor 10 as a particular direction of magnetization in the preferred path is thus retained and the highly advantageous non-destructive interrogation feature of this invention is thus realized. Had another binary value been stored in the conductor 10 as represented by an opposite direction of magnetization in the preferred longitudinal path the interrogating current pulse from the source 17 would have caused a rotation of the magnetizations in the domains in a clockwise direction with the result that a read-out voltage of the opposite polarity would have been induced in the read-out solenoid 20. Read-out signals of opposite polarities representative of the binary values which may be stored thus insure a positive differentiation between the information values read out.

Although the memory element above considered has been described and is shown in FIG. 1 as being a solid wire, it should be understood that the present invention is not so limited. Thus, for example, a composite element comprising an electrically conductive non-magnetic inner wire clad with a magnetic outer layer will also serve as a memory element according to the principles of the present invention. A coaxial arrangement may also be used in which case either both inner and outer conductors may be magnetic or a combination of magnetic or non-magnetic conductors may be used. Similarly the use of conductors of other cross-sections may be found advantageous in specified applications rather than the use of conductors of substantially circular cross-section contemplated in the illustrative embodiments herein described.

It is of course possible to store many bits of information along a single conductor memory element. The allowable number of such bits would be determined by the coercive force of the material used, the saturation flux density, and the physical dimensions of the conductor to name a few of the considerations involved. In accordance with these factors additional solenoids 18 may be spaced along the conductor 10 to define a number of information addresses. Since the interrogation of the conductor 10 is accomplished by applying a read current pulse to the conductor 10 itself, all of the magnetizations in the addresses will be simultaneously shifted. If additional read-out solenoids 20 are also inductively coupled to the conductor 10 at each of the addresses, the shift of magnetizations will induce a read-out voltage in each winding indicative of the binary value stored. Parallel read-out is thus available making possible read-out on either a word organized or on an individual bit basis as will appear in the detailed description of a magnetic memory matrix in accordance with the principles of this invention hereinafter.

It should be noted that although a separate solenoid is provided for read-out purposes, this function may advantageously be performed by the write solenoid 18. In this case suitable switching circuits, well-known in the art and not shown in the drawings, may advantageously be provided.

Although the write phase of the memory element described in the foregoing contemplated the application of a write current from the source 19 to the solenoid winding 18 alone, coincident current operation of the element is readily achieved. In this connection it was found that the field required to reverse the magnetization in the longitudinal flux path when the field generated by the winding 18 is applied, may be substantially reduced when a transverse field is applied simultaneously with the latter field. Thus a particular information value may be written into the conductor element 10 by applying a current of suitable polarity to the element 10 itself from another write current source which may advantageously be provided to produce the necessary transverse field. Coincidentally with the latter application of the current, a current of a magnitude insufficient to switch the magnetic polarity of the element 10 in the absence of the applied transverse field, that is, of a magnitude insufficient to produce the switching field $h$, is applied to the winding 18 from the write current source 19. The combined fields produced by the currents from the coincidentally energized current sources will thus reverse the magnetization in the element 10 to accomplish the write function as a coincident current operation. The foregoing coincident current mode of operating a memory element according to this invention is further described in connection with, and is illustrated in the embodiment of, this invention depicted in FIG. 3.

A magnetic memory element according to this invention is highly advantageous as a basic element in the fabrication of a coordinate memory array such as the illustrative array shown in FIG. 2. Such an array comprises a plurality of parallel magnetic conductor elements 23 in association with a plurality of conventional electrical conductors 24, which may conveniently comprise the X coordinate conductors of the array, and a transverse plurality of conventional electrical conductors 25, which may conveniently comprise the Y coordinate conductors of the array. Although not shown in the drawing, it is to be understood that each of the magnetic conductors 23 has a preferred longitudinal flux path established therein, either by subjecting each of the conductors 23 to a tensional stress or by annealing such a path in the conductors as previously described in connection with the embodiment of FIG. 1. One end of the conductors 24 and 25 is connected to a ground bus 26 and each of the conductors 24 and 25 is inductively coupled to each of the plurality of parallel conductor memory elements 23 at their intersections by means of the windings 27 and 28, respectively. The paired windings 27 and 28 inductively coupled to the conductors 23 thus mark the information addresses on the latter conductors. The other ends of each of the conductors 24 and 25 are connected to suitable X and Y coordinate write current pulse circuits 29 and 30, respectively. Such circuits are well-known in the magnetic memory and information handling art and in this case would produce appropriately timed current pulses of a magnitude such that when pulses on the X and Y conductors are combined a magnetomotive force of the magnitude $h$ will be produced with respect to the magnetic elements 23. In addition, each of the Y coordinate conductors 25 is also connected to information utilization circuits 31 capable of accepting binary coded read-out signals. Such circuits will also present themselves to one skilled in the art and do not here require detailed description. One end of each of the magnetic conductors 23 is also connected to the ground bus 26, the other end being connected to read current pulse circuits 32. The latter circuits are also well-known in the art and are similar in organization and operation to the write current pulse circuits 29 and 30.

The illustrative memory array of FIG. 2 may be either word organized or organized on an individual bit basis. Assuming the array to be word organized, in the writing operation the word level is selected by applying a current pulse of the proper magnitude to a selected X coordinate conductor 24. Coincidentally, the particular bit information is introduced by pulsing the Y coordinate conductors 25 in accordance with the particular bits of the word to be stored. The coincident currents thus applied cooperate to generate a magnetomotive force by means of the windings 27 and 28 in the longitudinal flux path of portions of the mangetic conductor 23 bearing the desired information addresses. A magnetic flux is thus induced in the longitudinal preferred path at the information addresses of particular polarities representative of the information to be stored.

The read operation is preformed by applying a read current pulse to only the magnetic conductor 23 containing the word to be read out. The application of the read current pulse develops a field everywhere orthogonal to the conductor 23, which field rotates the magnetizations in the magnetic domains of the addresses in which particular magnetizations have been induced in the write phase to induce an output voltage in both of the windings 27 and 28 coupled to the conductor 23 at those addresses. Accordingly, the voltage signals read out may be detected on either of the groups of coordinate conductors 24 or 25. In the illustrative arrangement being described, read-out is arbitrarily shown as accomplished via the Y coordinates 25 to the information utilization circuits 31. Although what has been described was assumed to be on a word organized basis, obviously any one of the signals appearing on the particular conductors 25 because of the induced voltages may be selectively utilized on a particular basis.

Although the illustrative matrix of FIG. 2 shows the inductive coupling of the intersecting coordinate conductors 24 and 25 as windings on the magnetic conductors 23, in actual practice these windings may effectively be achieved merely by passing the conductors 24 and 25 in the inductive proximity of the conductors 23. The matrix may then be conveniently fabricated by weaving the transverse conductors and the conductor elements together in a manner similar to that also employed in the fabrication of a wire mesh or screen. The facility of well-known methods of weaving may then be made available to obviate the tedious and time consuming threading methods generally heretofore only available in the fabrication of conventional toroidal core memories.

FIG. 3 shows another illustrative magnetic core memory matrix utilizing as a basic memory unit the magnetic memory element according to the principles of this invention. In this case, however, only one group of parallel conventional conductors is necessary to realize coincident current operation. Thus only conductors 25 are inductively coupled to the magnetic elements 23 by means of a winding 28 at the points of intersection. Each of the magnetic conductors 23 and conventional conductors 25 is again connected to a ground bus 26 and the conductors 25 are also connected to Y coordinate write current pulse circuits 30. The magnetic conductors 23 themselves are in this case connected at the other end to X coordinate write current pulse circuits 32. In the illustrative matrix now being described, however, the X coordinate write current pulses advantageously perform a dual function. In addition to providing the necessary field for coincident current writing, the same write current pulses are used to provide the orthogonal field for reading purposes. Thus by suitable control of the timing of the circuits 32 in any manner well known in the art, a substantial economy in driving circuitry is realized. Also connected to the Y coordinate conductors 25 are information utilization circuits 31 in the manner described for the illustrative matrix of FIG. 2.

Coincident current operation may be accomplished on a word organized basis by coincidentally applying write current pulses from the source 30 to the conductors 25, in accordance with the information bits to be stored, of a magnitude insufficient alone to induce the requisite magnetizations in the longitudinal flux path of a magnetic conductor 23. Coincidentally with the current from the source 30 an enabling current pulse is applied to the particular magnetic conductor 23, of the word level desired, from the X coordinate write current source 32. The cooperating fields thus generated serve to induce the magnetizations of the proper polarity in the information addresses to represent the information to be stored. Read-out is then accomplished in a manner identical to that described for the illustrative matrix shown in FIG. 2, the write current pulses from the source 32 being conveniently employed for this purpose as previously described. In the arrangement of FIG. 3 also, although the inductive coupling is shown as a winding 28, in actual practice the matrix may conveniently be fabricated by the weaving method suggested in connection with the illustrative matrix arrangement of FIG. 2.

It should be noted that a substantial advantage is gained in the use of the memory elements according to the principles of this invention, in addition to those already described, with respect to the nature of the read-out current pulses required to temporarily rotate the magnetizations of the domains in the information addresses. The magnitude and other characteristics of the read-out current pulses have been critical in generally all of the magnetic memory matrices heretofore known. In the present invention, on the other hand, the magnitude, for example, of the read-out current pulses need be maintained only between the limits of magnetization rotating capability at one end and the point beyond which destructibility of the information begins at the other end.

It should be further noted that the principles of this invention may advantageously be employed in connection with magnetic materials having a negative magnetostriction. In this case the preferred flux path established would be orthogonal to the direction of tension as would follow from the principles of ferromagnetism generally. Binary information would be stored in the clockwise or counter-clockwise directions of circular magnetism at each address and read-out would be accomplished across the magnetic conductor itself.

What have been described are considered to be only illustrative embodiments according to the principles of the present invention and it is to be understood that numerous other arrangements may be devised by one skilled in the art without departing from the spirit and scope thereof.

What is claimed is:

1. A memory element comprising a magnetic first conductor having a substantially rectangular hysteresis characteristic and having a tensional stress applied thereto, a non-magnetic second conductor inductively coupled to said first conductor, and means for applying currents to said second conductor for determining a remanent magnetic flux in said first conductor in one direction representative of a first information value.

2. A memory element according to claim 1, also comprising means for applying another current to said first conductor for temporarily switching the said remanent magnetic flux in said first conductor in another direction, and inductive means for detecting said switching of said remanent magnetic flux.

3. A memory element according to claim 1, also comprising means for applying a current of the opposite direction to said second conductor for switching the said remanent magnetic flux in said first conductor in another direction representative of a second information value.

4. A memory element comprising a magnetic first conductor having a substantially rectangular hysteresis characteristic, means for applying a tension to said first conductor to establish a preferred longitudinal flux path therein, non-magnetic second and third conductors inductively coupled to said first conductor, means for coincidentally applying currents to said second and third conductors to determine a remanent magnetic flux in said longitudinal flux path in one direction, means for applying a switching current to said first conductor to temporarily switch said remanent magnetic flux to another direction, and means for detecting voltage changes between the ends of one of said second and third conductors.

5. A memory element comprising a substantially straight magnetic wire having a substantially rectangular hysteresis characteristic, means for establishing a preferred longitudinal flux path in said wire, an electrical conductor inductively coupled to said wire, means for applying a current pulse to said conductor, said flux path comprising a portion of a magnetic circuit the remainder of which is closed through a path not including said magnetic wire such that said current pulse determines a remanent magnetization in only a discrete segment of said longitudinal flux path in one direction, means for shifting the remanent magnetization from said preferred flux path, and means for detecting said shift of said magnetization in said wire.

6. A memory element according to claim 5 in which said means for establishing a preferred longitudinal flux path in said wire comprises means for applying a predetermined tension to said wire.

7. A memory element according to claim 6 in which said means for shifting the remanent magnetization from said longitudinal flux path comprises means for applying a current pulse to said wire.

8. A memory element comprising a magnetic conductor comprising a continuous solid wire having a substantially rectangular hysteresis characteristic and having a substantially longitudinal flux path established therein, a plurality of electrical conductors inductively coupled to said magnetic conductor at discrete flux-switching segments defined thereon, means for selectively applying currents to said plurality of electrical conductors, said currents determining particular conditions of remanent magnetization in said longitudinal flux path at said discrete segments, means for applying another current to said magnetic conductor to temporarily switch said particular conditions of remanent magnetization, and means for detecting voltage changes in said plurality of electrical conductors.

9. An information storage matrix comprising a plurality of magnetic conductors each having a substantially rectangular hysteresis characteristic, means for establishing a substantially longitudinal flux path in each of said magnetic conductors comprising means for applying a tensional stress to said magnetic conductors, a plurality of transverse electrical conductors inductively coupled to each of said magnetic conductors, each of said electrical conductors defining an information address on each of said magnetic conductors, means for selectively applying a first current pulse to a particular one of said plurality of magnetic conductors, means for selectively applying a first current pulse to particular ones of said plurality of electrical conductors, said current pulses on said one of said magnetic and said ones of said electrical conductors combining to determine particular conditions of remanent magnetization in said longitudinal flux path at particular ones of said information addresses on said particular one of said plurality of magnetic conductors.

10. An information storage matrix according to claim 9 also comprising means for applying a second current pulse to said particular one of said plurality of magnetic conductors to temporarily switch the condition of said remanent magnetization at said particular ones of said information addresses.

11. An information storage matrix according to claim 10 also comprising means for detecting voltage changes in said electrical conductors.

12. A magnetic memory array comprising rows of magnetic conductors, each of said magnetic conductors comprising a solid wire having a substantially rectangular hysteresis characteristic and having a substantially longitudinal continuous flux path established therein, columns of electrical conductors inductively coupled to said rows of magnetic conductors, said columns and rows defining a plurality of memory address segments at the intersections thereof in each of said flux paths, and means for selectively applying coincident currents to said columns and one of said rows of conductors to determine a particular condition of remanent magnetization in the longitudinal flux path in particular ones of said plurality of address segments of said one of said rows.

13. A magnetic memory array according to claim 12 also comprising means for applying another current to said one of said rows of conductors to switch said particular condition of remanent magnetization in said particular ones of said plurality of address segments, and means for detecting induced voltages in each of said columns of electrical conductors.

14. An information storage matrix comprising a plurality of magnetic conductors each having a substantially rectangular hysteresis characteristic, means for applying a tensional stress to each of said magnetic conductors to establish a substantially longitudinal flux path in each of said magnetic conductors, a first and a second plurality of electrical conductors, each of said first plurality of electrical conductors having an intersection with each of said second plurality of electrical conductors, said first and said second plurality of electrical conductors being inductively coupled to each of said plurality of magnetic conductors at each of said intersections, each of said intersections defining an information address on said magnetic conductors, and means for simultaneously applying current pulses to a particular one of said first plurality of electrical conductors and to particular ones of said second plurality of electrical conductors to determine particular conditions of remanent magnetization in the longitudinal path of a particular one of said plurality of magnetic conductors at particular ones of said information addresses.

15. An information storage matrix according to claim 14 also comprising means for applying a switching current pulse to said particular one of said plurality of magnetic conductors to temporarily shift said particular conditions of remanent magnetization, and means for detecting voltage changes in one plurality of said first and said second plurality of electrical conductors.

16. A memory element comprising an electrically conductive solid magnetic wire of a material having high magnetic retentivity such that said wire has a plurality of conditions of remanent magnetization, said wire having established therein a substantially longitudinal flux path comprising a portion of a magnetic circuit the remainder of which is closed through a path not including said wire, and inductive means including said high retentivity magnetic wire for determining a particular condition of remanent magnetization in a single discrete discontinuous segment of said longitudinal flux path.

17. A memory element comprising a substantially straight magnetic first conductor comprising a solid wire of a material having a high magnetic retentivity such that said wire has a plurality of conditions of remanent magnetization, said wire having established therein a substantially longitudinal flux path comprising a portion of a magnetic circuit the remainder of which is closed through a path not including said wire, a second conductor inductively coupled to said first conductor, and means for applying a current to said second conductor for determining a particular condition of remanent magnetization in only a discrete segment of said longitudinal flux path.

18. A memory element according to claim 17 also comprising means for applying another current to said first conductor for switching said particular condition of remanent magnetization in said segment of said longitudinal path and inductive means for detecting said switching of said particular condition of remanent magnetization in said segment of said longitudinal path.

References Cited in the file of this patent

UNITED STATES PATENTS

| | | |
|---|---|---|
| 2,112,084 | Frey et al. | Mar. 22, 1938 |
| 2,706,329 | Hespenheide | Apr. 19, 1955 |
| 2,724,103 | Ashenhurst | Nov. 15, 1955 |
| 2,743,507 | Kornei | May 1, 1956 |
| 2,746,130 | Davis | May 22, 1956 |
| 2,792,563 | Rajchman | May 14, 1957 |
| 2,811,652 | Lipkin | Oct. 29, 1957 |
| 2,918,663 | Chen | Dec. 22, 1959 |
| 2,920,317 | Mallery | Jan. 5, 1960 |
| 2,982,947 | Kilburn et al. | May 2, 1961 |

FOREIGN PATENTS

| | | |
|---|---|---|
| 1,105,870 | France | July 13, 1955 |

OTHER REFERENCES

"Non-Destructive Sensing of Magnetic Cores," by Dudley A. Buck and Werner I. Frank, pages 822 to 830, "Communications and Electronics" for January 1954.